(12) United States Patent
Lawrenson et al.

(10) Patent No.: US 9,535,442 B2
(45) Date of Patent: Jan. 3, 2017

(54) METHOD AND APPARATUS FOR ENERGY CONTROL IN AN ENERGY STORAGE

(71) Applicant: Telefonaktiebolaget L M Ericsson (publ), Stockholm (SE)

(72) Inventors: Matthew John Lawrenson, Lausanne (CH); Julian Charles Nolan, Lausanne (CH)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 543 days.

(21) Appl. No.: 14/066,060

(22) Filed: Oct. 29, 2013

(65) Prior Publication Data
US 2015/0120068 A1 Apr. 30, 2015

Related U.S. Application Data (63) Continuation of application No. PCT/EP2013/072623, filed on Oct. 29, 2013.

(51) Int. Cl.
*G05F 1/66* (2006.01)
*B60L 11/18* (2006.01)
*H02J 7/02* (2016.01)

(52) U.S. Cl.
CPC .............. *G05F 1/66* (2013.01); *B60L 11/1848* (2013.01); *H02J 7/02* (2013.01)

(58) Field of Classification Search
CPC ............ G05F 1/66; H02J 7/02; B60L 11/1848
See application file for complete search history.

(56) References Cited

U.S. PATENT DOCUMENTS

| 7,313,467 | B2 * | 12/2007 | Breed | G07C 5/008 307/9.1 |
|---|---|---|---|---|
| 2005/0125117 | A1 * | 6/2005 | Breed | G07C 5/008 701/31.5 |
| 2008/0129475 | A1 * | 6/2008 | Breed | G07C 5/008 340/438 |

(Continued)

FOREIGN PATENT DOCUMENTS

EP 2592428 A1 5/2013

OTHER PUBLICATIONS

International Search Report and Written Opinion issued on Jul. 9, 2014 in International Application No. PCT/EP2013/072623, 8 pages.

*Primary Examiner* — Ramesh Patel
(74) *Attorney, Agent, or Firm* — Rothwell, Figg, Ernst & Manbeck, P.C.

(57) ABSTRACT

A method, performed in an apparatus for energy control in an energy storage, for determining a composition of energy in the energy storage using a data storage holding information of a determined composition of the energy in the energy storage. The composition of energy comprises one or more energy types and a proportion of each energy type. The method includes measuring a quantity of energy provided in the energy storage, obtaining from the energy provider data indicative of a property of the energy, calculating a proportion of each energy type in the energy based on the obtained data, determining the composition of energy based on the calculated proportion of each energy type in the energy in the energy storage and the measured quantity of energy, and storing the determined composition in the data storage.

20 Claims, 4 Drawing Sheets

(56) References Cited

U.S. PATENT DOCUMENTS

| | | | | |
|---|---|---|---|---|
| 2010/0076825 A1* | 3/2010 | Sato | ............... | B60L 3/12 |
| | | | | 705/14.1 |
| 2010/0235008 A1* | 9/2010 | Forbes, Jr. | ............... | G06Q 10/00 |
| | | | | 700/291 |
| 2012/0001487 A1* | 1/2012 | Pessina | ............... | H04L 12/28 |
| | | | | 307/31 |
| 2012/0173034 A1* | 7/2012 | Taima | ............... | B60L 3/12 |
| | | | | 700/295 |
| 2012/0173444 A1* | 7/2012 | Zik | ............... | G06Q 10/10 |
| | | | | 705/317 |
| 2012/0206093 A1* | 8/2012 | Schaefer | ............... | B60L 11/1822 |
| | | | | 320/107 |
| 2012/0296567 A1* | 11/2012 | Breed | ............... | G01C 21/26 |
| | | | | 701/468 |
| 2013/0214763 A1* | 8/2013 | Kubota | ............... | H02J 3/14 |
| | | | | 324/113 |
| 2015/0120499 A1* | 4/2015 | Lawrenson | ............... | G06Q 30/0609 |
| | | | | 705/26.35 |

* cited by examiner

METHOD AND APPARATUS FOR ENERGY CONTROL IN AN ENERGY STORAGE

TECHNICAL FIELD

The disclosure pertains to the field of controlling energy in an energy storage. More particularly, the disclosure relates to a method for determining a composition of energy in an energy storage. The disclosure further relates to a corresponding apparatus for energy control in an energy storage.

BACKGROUND

There is in the general public a growing attention towards the protection of the environment and an increasing awareness to issues related to energy. It has become a priority for some people to minimize their overall energy consumption, by e.g. using more energy-efficient appliances and/or travelling using energy-responsible means of transportation. Consumers know that energy can be produced using various energy sources, including renewable sources of energy. Renewable sources of energy are considered more respectful of the environment because they derive from natural processes that are continually replenished such as sunlight, wind, rain, tides, waves and geothermal heat.

However, it is hard for the consumers to monitor if and to what extent renewable energies are parts of the energy currently provided to them. Moreover, energy is usually provided to a "grid" (i.e. energy network) by several suppliers across countries, from various sources, some being renewable energies and some being non-renewable energies and each with various degrees of carbon emissions generated. An attempt to live a more environmentally responsible lifestyle results in a relatively unclear combination of types of energies supporting this lifestyle. In this context, it becomes increasingly hard to assess how a consumer's effort towards an environmentally friendly lifestyle accounts for in terms of environmental impact.

Existing systems have tried to address the issue of transparency of energy composition. US20120173034A1 provides an electric power visualization device for a household which visualizes content of electric power for an input-side electric power or load-side electric power in an electric power management system which receives electric power generated by a plurality of power generation methods as the input-side electric power and supplies to a load as the load-side electric power based on the input-side electric power, comprising a display unit which classifies the input-side electric power or the load-side electric power into generated electric power of each of the power generation methods, and displays with different display methods for each classification of the power generation method.

US2010235008A1 discloses a method for determining carbon credits earned as a result of a control event in which power is reduced to at least one service point serviced by a utility.

However, these existing solutions work only on energy consumed at one point of consumption in the energy grid and do not help in assessing energy stored in an energy storage.

Energy stored in the storage is most of the time not connected to a point of consumption in the energy grid. Indeed, the relative merit of e.g. choosing to drive an electrical vehicle instead of an internal combustion engine vehicle involves a higher level of complexity as the vehicle is most of the time disconnected from the energy grid. Consumers are entitled to be provided with a means to understand what energy types are involved in a system (e.g. a vehicle) operating on energy stored in an energy storage.

SUMMARY

This disclosure provides a method for controlling a property of energy stored in an energy storage. This is accomplished by assessing a composition of energy stored in the energy storage.

According to the disclosure, it provides a method, performed in an apparatus for energy control in an energy storage, for determining a composition of energy in the energy storage, using a data storage holding information of a determined composition of the energy in the energy storage. The composition of energy comprises one or more energy types. The method comprises: measuring a quantity of energy provided in the energy storage, obtaining from an energy provider data indicative of a property of the energy provided in the energy storage, calculating a proportion of each energy type in the energy provided in the energy storage based on the obtained data, determining the composition of energy provided in the energy storage based on the calculated proportion of each energy type, and the measured quantity of energy, and storing the determined composition in the data storage.

This disclosure provides an efficient tagging of energy types comprised in energy stored in an energy storage. This disclosure provides an advantage for deriving a "quality" metric of the energy stored in the energy storage that represents the degree of renewable energies. This can be beneficial to a consumer e.g. if a tax to be paid by the consumer is dependent on the energy types present in the energy stored in a system used by the consumer.

According to one aspect of the disclosure, the method further comprises obtaining, from the data storage, a previous composition of energy and determining the composition of energy provided in the energy storage further based on the previous composition of energy. This provides an advantage in terms of accuracy of the composition determined by the method disclosed herein. This aspect provides an up-to-date composition of energy, in an event of depletion as well as at charging.

According to one aspect of the disclosure, the method further comprises communicating to a user interface the composition of energy in the energy storage. This has the advantage of allowing a consumer to understand the composition of energy in the energy storage, and even to improve the consumer's selection of energy providers based on the communicated composition of energy.

According to one aspect of the disclosure, the method is performed in an electrical vehicle. An advantage here is that this aspect allows deriving a metric that truly assesses the merit of driving an electrical vehicle in terms of eco-friendliness, which would otherwise be impossible to assess.

According to one aspect of the disclosure, it relates to an apparatus for energy control in an energy storage. The energy storage stores energy having a composition of energy. The composition of energy comprises one or more energy types. The apparatus comprises: a first interface configured to receive from an energy provider data indicative of a property of the energy, a second interface configured to access a data storage holding information of a composition of the energy in the energy storage, and a controller configured to measure a quantity of energy provided over the first interface, to obtain using the first interface data indicative of a property of the energy in the energy storage, to calculate a proportion of each energy type in the energy of the energy storage based on the obtained data, to determine a composition of energy in the energy storage based on the calculated proportion of each energy type and the measured quantity of energy, and to store the determined composition of energy in the data storage. This provides an advantage in that a device comprising the apparatus described herein is provided with a means for a third party or a consumer to assess a compliance of with a certification such as an eco-certification or an ISO certification (e.g. ISO 14000, ISO 14001, ISO 14020 etc.).

According to one aspect of the disclosure, it relates to an electrical vehicle comprising an apparatus as described above. An electrical vehicle comprising the apparatus for energy control described herein offers the advantage of having its operations being evaluated truly in terms of environmental impact.

According to one aspect of the disclosure, it relates to a computer program, comprising computer readable code which, when run on an apparatus, causes the apparatus to perform the method as described above.

With the above description in mind, the object of the present disclosure is to overcome at least some of the disadvantages of known technology as described above and below.

BRIEF DESCRIPTION OF THE DRAWINGS

The present technique will be more readily understood through the study of the following detailed description of the embodiments/aspects together with the accompanying drawings, of which.

It should be added that the following description of the embodiments is for illustration purposes only and should not be interpreted as limiting the disclosure exclusively to these embodiments/aspects.

DETAILED DESCRIPTION

The general object or idea of embodiments of the present disclosure is to address at least one or some of the disadvantages described above as well as below. The various steps described below in connection with the figures should be primarily understood in a logical sense, while each step involves the communication of one or more specific messages depending on the implementation and protocols used.

In the present disclosure, the term "energy" refers to e.g. electrical energy such as electricity or power. As used herein, the term "electrical energy" refers to energy which has been converted from electrical potential energy. Electrical energy can be generated in various methods, each energy generating method leading to the energy being categorized as an energy type. Energy is quantified in e.g. Watt-hour, Ampere-hour, or Joule.

As used herein, the term "energy type" is defined based on a type of method or source used to generate the energy. The energy can be generated at a power station by electromechanical generators, primarily driven by heat engines. Depending on how the heat engines are driven, the energy type can for example be a nuclear energy type, a fossil fuel energy type (involving coal, natural gas, or petroleum), which are both considered non-renewable energy types. The energy types which are considered to be renewable energy types can be for example a hydroelectric energy type, a wind energy type, a biomass energy type, a solar energy type, a geothermal energy type, an ocean thermal energy conversion, and a wave energy type. Energy types may also be grouped in e.g. fossil fuels/non-fossil fuels energy types. The wide variety of energy types available for provision of energy results in an energy mix in which it is hard to track each energy types and their respective contributions.

As used herein, the term "energy property" is defined as a characteristic related to energy, such as an energy type, an energy generation method, an energy provenance, a location of a source of energy, a source of energy, an origin of energy, a location of origin, a price, and a delivery time. Energy property comprises energy provenance which provides contextual and circumstantial evidence of the original production of energy.

As used herein the term "energy storage" refers to a physical medium that stores energy to perform operations at a later time. Examples of energy storage include an accumulator, a capacitor, a battery such as a rechargeable battery. A battery can be for example a lead-acid battery, a Lithium-ion battery, a Nickel metal hydride battery, or a zebra battery.

As used herein the term "energy provider" refers to any entity that generates and distributes energy to its customers, or an entity that purchases energy from an energy-generating entity and distributes the purchased energy to its customers, or an entity that supplies energy created by alternative energy sources, such as solar or wind sources, to energy distribution entities through a grid or energy network. An energy provider is for example a utility operator, or an energy grid provider. Energy can be generated and then supplied by an energy provider or energy can be not generated, stored and then supplied by an energy provider. Each energy provider can be categorized with an energy type. Where a single energy provider provides multiple energy types, the categories follow the energy types.

The general idea of the proposed technique is to allow a control of energy in an energy storage such as a battery. Controlling the energy in the energy storage is based on a property related to the energy, e.g. the sources of energy provided by energy providers in a grid/energy network. As each energy provider delivers energy to the grid, their energy is agglomerated with the energy from other providers and then delivered to the end consumer. Energy providers contributing to the grid are thus multiple, and sources are varying across energy providers but also for the same energy provider. This results in the energy stored in the battery having a composition that comprises for example one or more energy types from one or more provenances, with a proportion of each energy type from each provenance. Therefore, controlling the energy provided in the battery involves determining the composition of energy stored in the battery. This provides a consumer with a better understanding of the contribution of each energy type to the energy stored in the battery. For example, if the battery is provided in an electrical vehicle, then with the proposed technique the consumer is able to assess the true merit of driving his electrical vehicle instead of an internal combustion engine vehicle.

Embodiments of the present disclosure relate, in general, to the field of energy control in an energy storage. However, it must be understood that the same principle is applicable in an energy storage whether the energy storage is in an electrical vehicle, in an appliance, or in any other machine.

Figure 1:
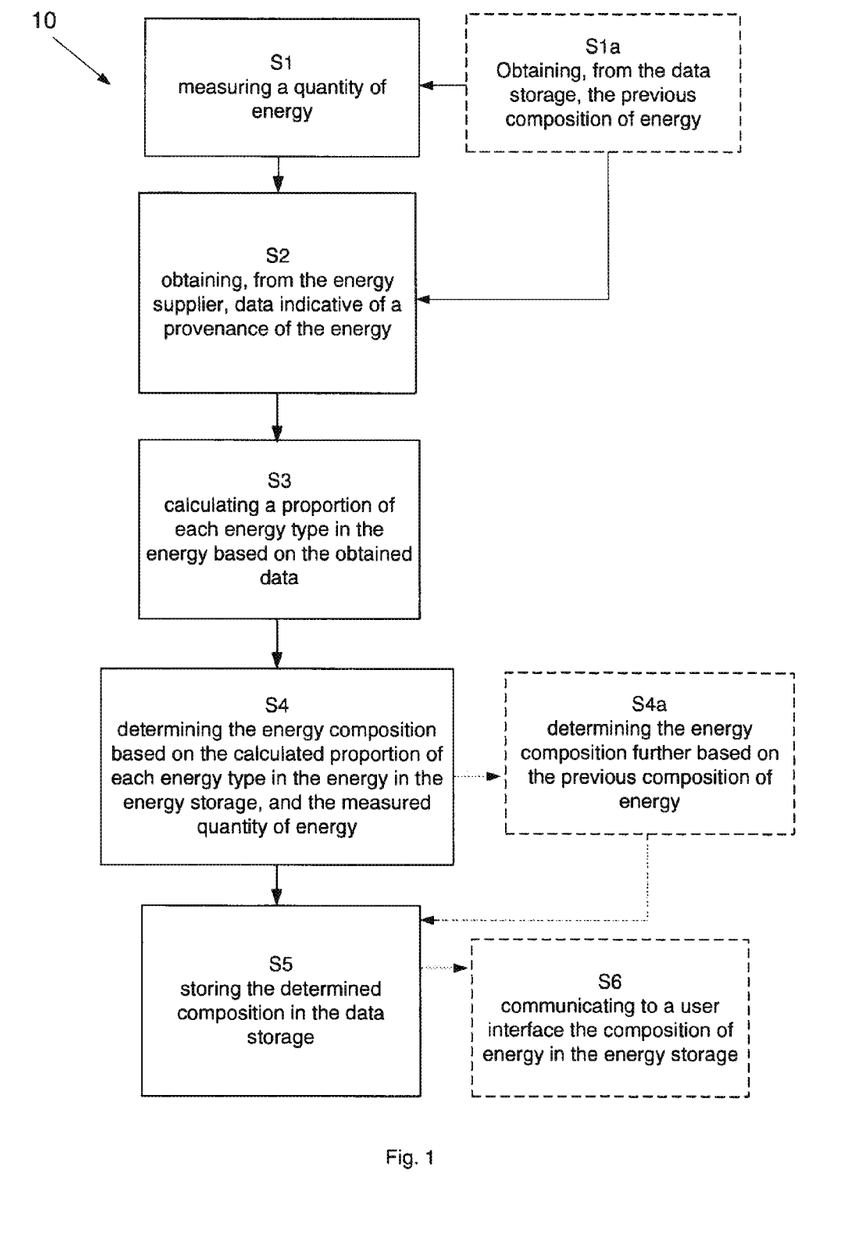
FIG. 1 is a flow chart illustrating embodiments of method steps, performed in an apparatus for energy control, for determining a composition of energy in an energy storage.

In FIG. 1, a method, performed in an apparatus 30 for energy control in an energy storage 306, for determining a composition of energy in the energy storage 306 is disclosed. The method uses a data storage 304 holding information of a determined composition of the energy in the energy storage 306. The composition of energy comprises one or more energy types. The method of FIG. 1 may be triggered by a charging occurrence, a depletion occurrence or may be performed periodically to keep an up-to-date composition of energy in the energy storage 306.

In the first step S1, the apparatus 30 for energy control measures a quantity of energy in the energy storage 306. Or alternatively, the apparatus 30 obtains a quantity of energy stored in the energy storage 306 from e.g. an energy storage management system of energy storage 306. The energy storage management system comprises e.g. a gauge to measure the quantity of energy in the energy storage 306. In a charging event, the apparatus 30 may also obtain the quantity of energy provided to the energy storage 306 by the energy storage management system or a management system of a charging station.

In the next step S2, the apparatus 30 obtains from the energy provider data indicative of a property of the energy provided in the energy storage 306. Data indicative of a property of the energy is for example metadata associated with the energy or with a provenance of the energy. The data indicative of a property of the stored or provided energy can be obtained from a database remotely via a communication link that is e.g. a machine-to-machine M2M communication link, and/or a wireless communication link, and/or a wired communication link, and/or power line communication link. The remote database stores the property of the energy or information about the energy types and their proportion in the energy provided during a time period. The database is either located in a network under the control of the energy provider or in a network under the control of another entity such as a grid manager, an energy distributor or a third party. The data indicative of the property of the provided energy is e.g. collated and then stored centrally in a database e.g. at the energy provider network or at a grid manager or at a third party which makes the data available for public use. The data indicative of the property of the provided energy may also be collated locally e.g. at the point of charging of the energy storage 306. The data indicative of the property of the energy in the energy storage 306 can also be extracted from information related to an energy mix available publicly or at an energy provider. The energy mix may be computed continuously or periodically with a short time period so as to provide an energy mix as accurate as possible. If it is not possible to obtain the data indicative of a property of the energy provided in the energy storage 306 from the energy provider due to the lack of communication link or any other reason, the energy provided is referred to as "unknown" energy type. When a communication link to the same energy provider is established at a later time, then the apparatus 30 obtains data indicative of a property of the energy stored in the energy storage 306 and the "unknown" energy type is overwritten by a composition to be determined based on the obtained data.

In the following step S3, the apparatus 30 calculates a proportion of each energy type in the energy provided in the energy storage 306 based on the obtained data. A proportion of an energy type in the energy of an energy storage is for example the relative energy contribution, i.e. the amount of an energy type supplied divided by the total amount of energy supplied. The proportion is typically a ratio. In an illustrative example of where the proposed technique is applicable, we assume that the computation results in proportions being 60% non-renewable energy type and 40% of renewable energy type at point in time where the composition of the energy in the energy storage 306 is to be determined.

The next step S4 relates to determining the composition of energy provided in the energy storage 306 based on the calculated proportion of each energy type in the energy in the energy storage and the measured quantity of energy. Continuing on the above illustrative example of where the proposed technique is applicable, we assume that it has been measured in the earlier step (or a measurement has been obtained) that the total quantity of energy present in the energy storage 306 comes from one energy provider and represents 10 units of energy. Then, the apparatus 30 determines the composition of the energy stored in the energy storage 306 based on the calculated proportions of each energy type and the measured quantity 10 units as follows: 6 units of non-renewable energy type and 4 units of renewable energy type.

In step S5, the apparatus 30 for energy control stores the determined composition in the data storage. The apparatus 30 stores the determined composition in e.g. a database that maintains an entry for each energy type and shows the current amount of energy within the energy storage that is attributed to each energy type. Storing the determined composition is used also for a next determination of a composition of energy. Determining the composition is performed for example periodically, or after depletion or charging of the energy storage 306. Depletion of energy from the energy storage can happen due to the consumption of the energy to perform an operation or due to losses or due to releasing of energy to the energy network.

According to one aspect of this disclosure, the apparatus 30 obtains S1a from the data storage 304 a previous composition of energy, and determines S4a the composition of energy provided in the energy storage 306 further based on the previous composition of energy. FIG. 1 shows an example of how steps S1a and S4a may be integrated with the steps described above. The previous composition of energy refers the composition previously stored in the data storage 304, which corresponds to the composition of the energy previously stored in the energy storage. The expression "previously" refers to any time prior to the current ongoing determination of composition by apparatus 30. Continuing on the above illustrative example of where the proposed technique is applicable, we assume that the previous composition obtained is 6 units of non-renewable energy type and 4 units of renewable energy type (i.e. total previous quantity of energy is 10 units), and that the energy in the energy storage has been depleted. The apparatus 30 measures (or obtains a measurement) the quantity of energy in the energy storage to be 8 units. The apparatus 30 performs steps S3 using a uniform reduction by 1 unit of each energy type (i.e. 62.5% non-renewable energy type and 57.5% renewable energy type) and S4 (i.e. 5 units of non-renewable energy type and 3 units of renewable energy type). The reduction may also be distributed differently, e.g. based on coefficients. The determined composition of energy stored in the energy storage is then 5 units of non-renewable energy type and 3 units of renewable energy type.

According to one aspect of this disclosure, the apparatus 30 communicates S6 to a user interface the composition of energy in the energy storage 306. The composition of energy can for example be communicated from the data storage 304 to the user interface. The communication is performed via e.g. a M2M communication, and/or a wireless communication, such as short-range wireless communication (e.g. RFID, Bluetooth, NFC, WiFi, or cellular communication).

According to one aspect of this disclosure, the method described above is performed in electrical vehicle. An electrical vehicle is defined here as a vehicle mainly operating based on electricity. Electricity stored in an energy storage is a central element for an electrical vehicle. Users driving electrical vehicle are under the impression that their means of transportation is "cleaner" than travelling with a combustion engine vehicle. When thoroughly evaluated, this may not hold true if the electricity provided to the electrical vehicle is mainly generated from non-renewable sources of energy. Therefore, the method for determining an energy composition of energy stored in an energy storage in an electrical vehicle would help the electrical vehicle driver to understand how "clean" is his means of transportation. Using the determined composition, the driver is able to estimate what and how much of an energy type is currently available in the energy storage, has been historically used to charge the energy storage of his electrical vehicle, and is currently stored in the energy storage of his vehicle. This provides an advantage in terms of a consumer's understanding of the daily merit of an electrical vehicle.

According to one aspect of this disclosure, the apparatus 30 determines S1b a time period for charging energy on the energy storage 306 based on the composition of the energy at the time of charge, and triggers S1c the charge of energy on the energy storage 306 at the determined time period. As energy generation modes vary throughout the day and year, the apparatus 30 may use the obtained data indicative of a property of the energy provided by the energy provider to derive a time of day or year that is more favourable, e.g. a time when a proportion of renewable energy type in the energy composition of the energy available is above a threshold chosen by a consumer, to charge the energy storage. When the favourable time is determined and reached, the apparatus 30 triggers the charge of energy on the energy storage 306.

Figure 2:
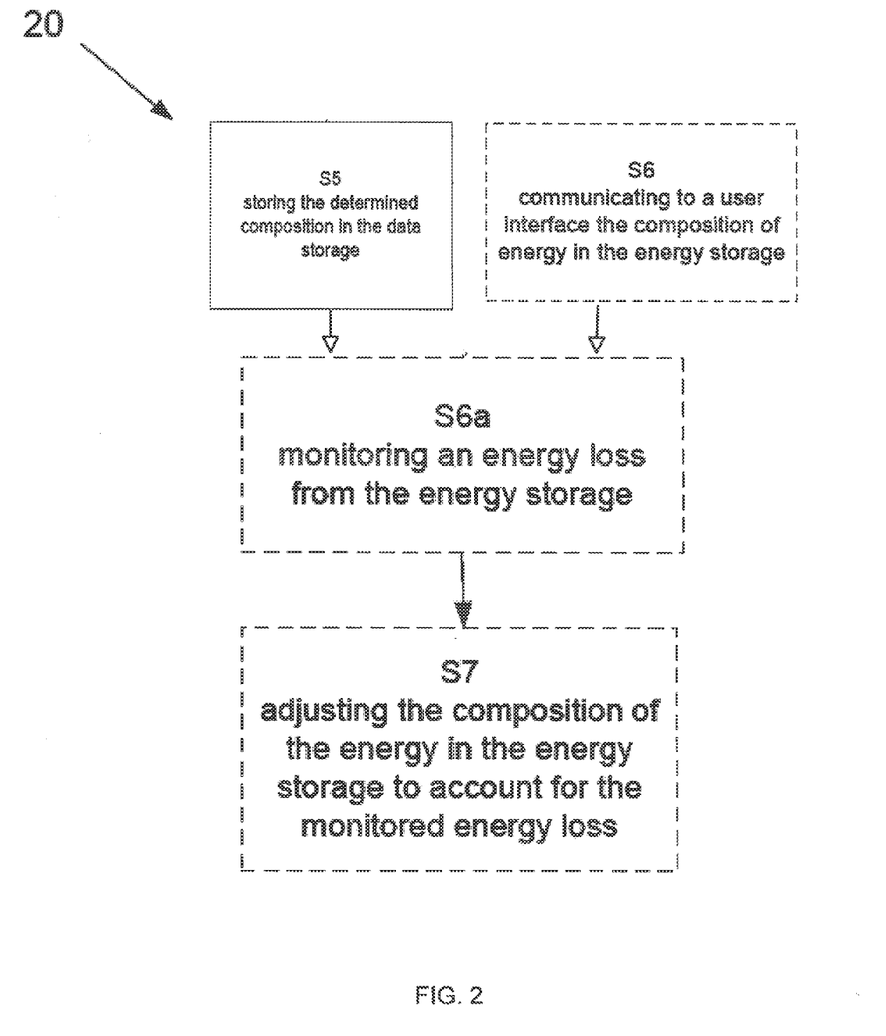
FIG. 2 is a flow chart illustrating method steps performed by an apparatus for energy control according to an exemplary embodiment of the present disclosure.

FIG. 2 presents a method performed by an apparatus for energy control according to an exemplary embodiment of the present disclosure, where energy losses at the energy storage are accounted for. The apparatus 30 monitors S6a an energy loss from the energy storage 306, and adjusts S7 the composition of the energy in the energy storage 306 to account for the monitored energy loss. Depletion of energy from the energy storage can happen due to the consumption of the energy to perform an operation or to release energy to the energy network, or due to losses and synchronization issues. Losses and synchronization issues can be due to the internal resistance of the energy storage or due to a degradation of the energy storage caused by temperature. The accuracy of the composition data in the data storage 304 is affected e.g. as the energy storage is either discharged to zero capacity then re-charged, or charged to full capacity. The apparatus 30 may monitor the environmental conditions, e.g. temperature, and may estimate the adjustment necessary to maintain the accuracy of the composition data in the data storage 304.

According to one aspect of this disclosure, the data indicative of the property of the energy comprises an energy type, a start time, a stop time, a supply time unit, a price and an amount of energy supplied. The start time and the stop time may be in absolute time units representing defined time duration. The start or stop time may be the start or stop time of charge or depletion. The data indicative of the property of the energy may further comprise a supply time unit, STU, which is a predefined time unit for supply, e.g. 1 s, 1 min, 20 min or 1 h. The amount of energy supplied may be the amount of energy supplied during supply time unit. The data indicative of the property of the provided energy comprises e.g. data indicative of a provenance of energy in the form: Energy provider ID/Energy Type/Start time and stop time/amount of energy supplied during a STU. The data indicative of the property of the provided energy may be encrypted during the transmission from energy provider to apparatus 30.

Figure 3:
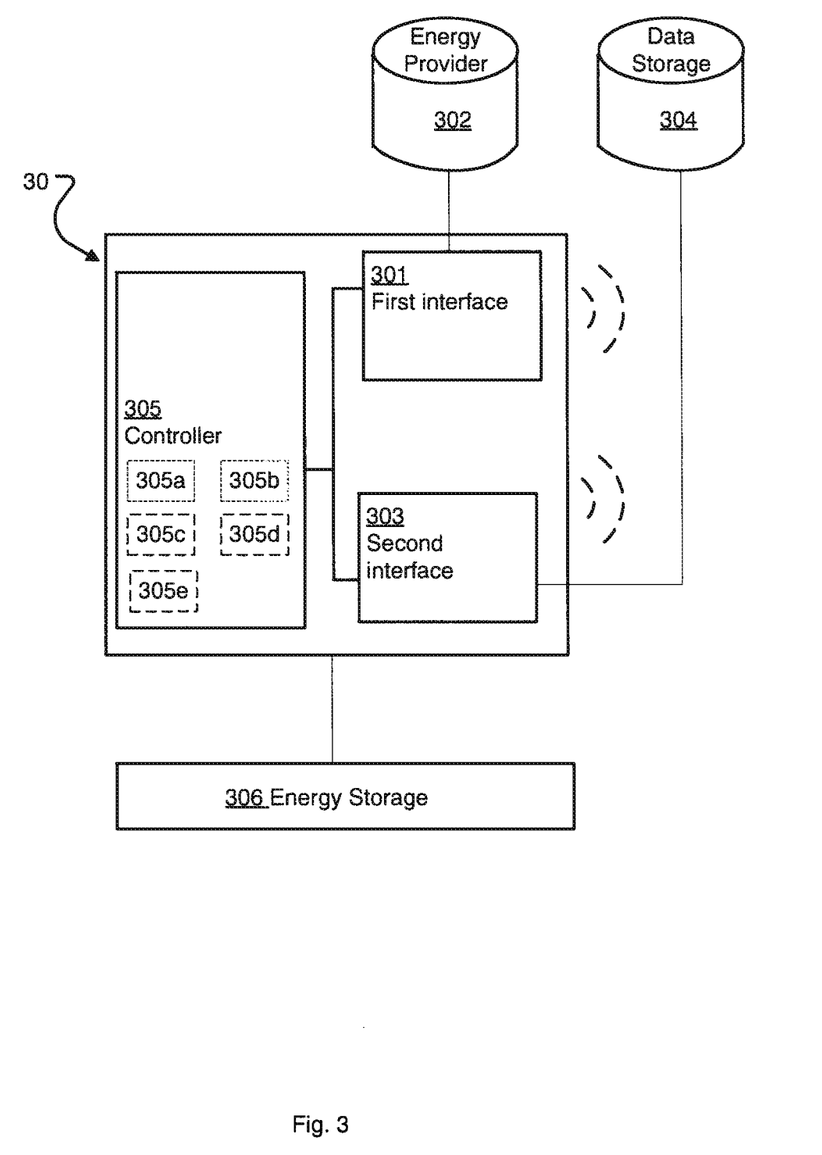
FIG. 3 is a block diagram illustrating an embodiment of an apparatus for energy control in an energy storage according to an exemplary embodiment of the present disclosure.

Turning now to FIG. 3, a schematic diagram illustrating some modules of an exemplary embodiment of an apparatus 30 for energy control in an energy storage 306 is described. The energy storage 306 is charged by energy having a composition of energy. The composition of energy comprises one or more energy types and a proportion of each energy type. The apparatus 30 comprises a first interface 301, a second interface 303, and a controller 305. The first interface 301 is configured to receive, from an energy provider 302, data indicative of a property of the energy. The second interface 303 is configured to access a data storage 304 holding information of a composition of the energy in the energy storage 306. The controller 305 is configured to measure a quantity of energy provided over the first interface, and configured to obtain using the first interface 301 data indicative of a property of the energy.

The controller 305 is configured to calculate a proportion of each energy type in the energy of the energy storage 306 based on the obtained data, and to determine a composition of energy in the energy storage 306 based on the calculated proportion of each energy type and the measured quantity of energy. The controller 305 is configured to store the determined composition of energy in the data storage 304. Hence, the controller comprises a measurement module 305a, an obtaining module 305b, a calculator 305c, a determiner 305d and a storing module 305e. The measurement module 305a measures a quantity of energy provided over the first interface. The measurement module 305a may also measure or obtain the quantity of energy over another interface such as the second interface or a third interface towards the energy storage management system. The obtaining module 305b obtains using the first interface 301 data indicative of a property of the energy in the energy storage 306. The calculator 305c calculates a proportion of each energy type in the energy of the energy storage 306 based on the obtained data. The determiner 305d determines a composition of energy in the energy storage 306 based on the calculated proportion of each energy type and the measured quantity of energy. The storing module 305e stores the determined composition of energy in the data storage 304. The storing module 305e uses the second interface 303 to send for storage the determined composition of energy in the data storage 304.

The controller 305 may be constituted by any suitable Central Processing Unit, CPU, microcontroller, Digital Signal Processor, DSP, etc., capable of executing computer program code.

According to one aspect of the disclosure, the controller 305 is a processor capable of executing computer program code that enables the controller to obtain using the first interface 301 data indicative of a property of the energy. The controller 305 executing the computer program code is capable of calculating a proportion of each energy type in the energy of the energy storage 306 based on the obtained data. The computer program code executed on the controller 305 enables the controller 305 to determine a composition of energy in the energy storage 306 based on the calculated proportion of each energy type and the measured quantity of energy, and to store the determined composition of energy in the data storage 304. The computer program may be stored in a memory. The memory can be any combination of a Read And write Memory, RAM, and a Read Only Memory, ROM. The memory may also comprise persistent storage, which, for example, can be any single one or combination of magnetic memory, optical memory, or solid state memory or even remotely mounted memory.

As an alternative the steps, functions, procedures and/or blocks described above may as an alternative, be implemented in completely or partly in hardware using any conventional technology, such as discrete circuit or integrated circuit technology, including both general-purpose electronic circuitry and application-specific circuitry. The memory and the processor are then replaced by corresponding hardware blocks.

According to one aspect of the disclosure, the first interface and the second interface are for example arranged for M2M communication. The first interface and the second interface comprise means for wireless and/or wired communication. The first interface may for example be arranged for power line communication where data indicative of a property is encoded and transferred along the grid cables.

According to one aspect of the disclosure, the second interface 303 is further configured to receive a previous composition of energy from the data storage 304, and wherein the controller 305 is further configured to determine the composition of energy further based on the received previous composition of energy.

In an illustrative example of where the proposed technique is applicable, we assume that an energy storage 306 holds 10 units of energy with the following energy composition stored in a data storage 304: 6 units of non-renewable, NR, energy type and 4 units of renewable, R, energy type. At a charging station, the energy storage is charged with additional 12 units of energy. The apparatus 30 may be configured to record the current time when the charge begins and the current time when the charge ends as increments of STUs. The absolute current time is for example provided by a clock embedded in the apparatus 30, or by the charging unit connected to the energy storage, or via a smart meter connected to the grid. The apparatus 30 can measure the amount of energy provided by the charging unit using an external meter, possibly comprised in the energy storage management system. The apparatus 30 obtains from the energy provider 302 data indicative of a property of the energy provided, and calculates the proportion of each energy type in the provided energy, which results in 50% R energy type and 50% NR energy type. The data indicative of a property of the energy provided may be obtained regularly during the charge with discrete sections of information being transferred or wholly at the end of the charge. The controller 305 determines the composition of the energy in the energy storage based on:

The previous composition stored in the data storage 304: 6 units of NR energy type, and 4 unit of R energy type;
The calculated proportions for the provided energy: 50% R energy type and 50% NR energy type;
The measured quantity of energy provided: 12 units.

The controller 305 determines the composition of energy to be: 6+50%×12=12 units of NR energy type and 4+50%×12=10 units of R energy type. The controller 305 then stores the determined composition in the data storage 304.

As energy is being used from an energy storage 306 (e.g. electrical vehicle being driven if the energy storage is in an electrical vehicle), the energy is depleted from the energy storage 306 and this affects the energy composition of the energy stored in the energy storage 306. The controller 305 would then monitor the amount of energy used and would subtract the amount of energy used from the amount of each energy type either uniformly across energy types (i.e. pari passu for each energy type) or as a ratio of the current level of each energy type.

In an embodiment, the controller 305 calculates the contribution per energy type by multiplying the relative energy contribution of the energy type with the amount of energy provided during a Supply Time Unit.

According to one aspect of the disclosure, the first interface 301 is further configured to communicate to a user interface the composition of energy at the energy storage 306; and wherein the user interface is configured to display the composition of energy stored in the energy storage 306 to a user. The user interface is e.g. part of a dashboard of an electrical vehicle or a display of a handheld device (e.g. a smart phone or tablet) paired with the apparatus 30.

The data storage 304 may be a memory. The memory can be any combination of a Read And write Memory, RAM, and a Read Only Memory, ROM. The memory may also comprise persistent storage, which, for example, can be any single one or combination of magnetic memory, optical memory, or solid state memory or even remotely mounted memory.

According to one aspect of the disclosure, the data storage 304 comprises a database, which has an entry corresponding to an energy type. The data storage 304 may be internal to the apparatus 30 for energy control or external to the apparatus 30 for energy control. If the data storage 304 is external to the apparatus 30, the data storage 304 is remotely located or co-located to the controller 305 of the apparatus 30. If co-located with the controller 305, the data storage 304 may be located in an electrical vehicle comprising the apparatus 30, but outside the apparatus 30. The data storage 304 when remotely located from the vehicle may be accessible by one or more apparatus 30.

In an embodiment, the data storage 304 is located in the same system as the energy storage 306, such as in a vehicle. Alternatively, the data storage 304 is in a system different than the system comprising the energy storage 306.

The present disclosure further relates to an electrical vehicle 400 comprising an apparatus 30 for energy control in an energy storage as described above. An electrical vehicle uses one or more electric motors or traction motors for propulsion. The following types of electric vehicles exist: those that are directly powered from an external power station, those that are powered by stored electricity originally from an external power source, and those that are powered by an on-board electrical generator, such as an internal combustion engine (a hybrid electric vehicle) or a hydrogen fuel cell. Electrical vehicles include electric cars, electric trains, electric lorries, electric airplanes, electric boats, electric motorcycles and scooters and electric spacecraft.

Figure 4:
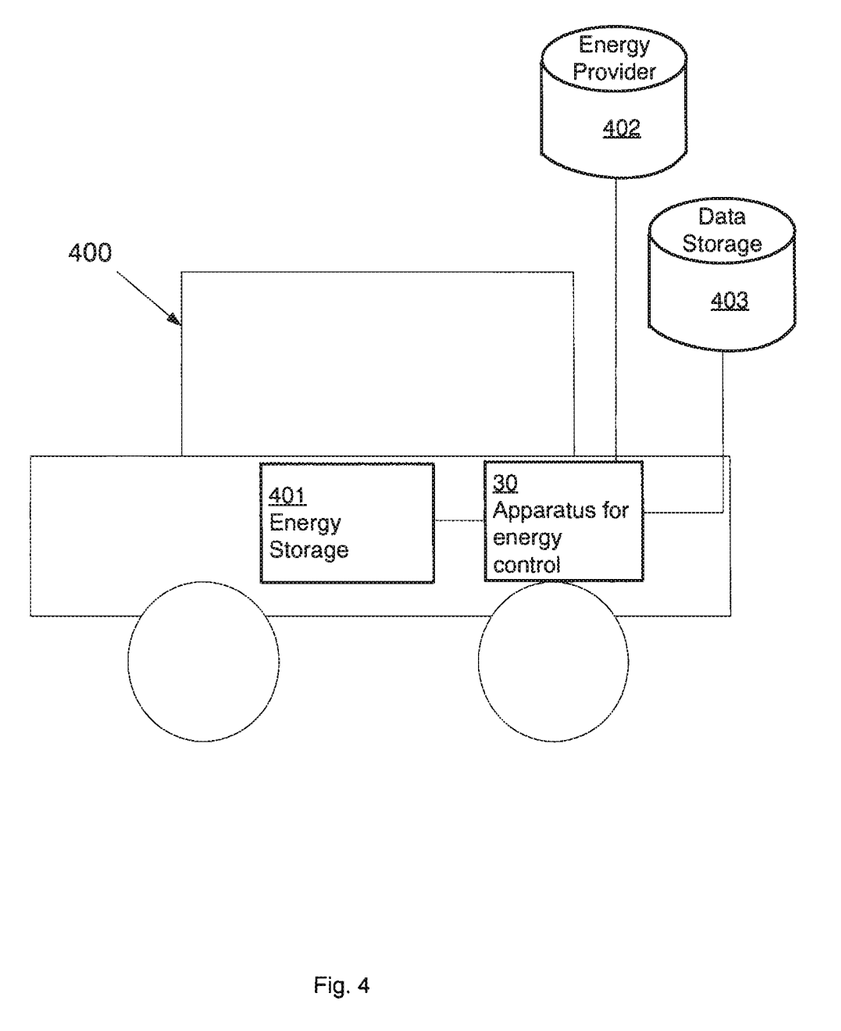
FIG. 4 is a block diagram illustrating an embodiment of an electrical vehicle comprising an apparatus for energy control in an energy storage according to an exemplary embodiment of the present disclosure.

FIG. 4 shows a block diagram illustrating an embodiment of an electrical vehicle 400 according to the present disclosure. The electrical vehicle 400 comprises an energy storage 402 and an apparatus 30 for energy control in the energy storage 401. The apparatus 30 of vehicle 400 is connected via a first interface to an energy provider 402, and via a second interface to a data storage 403.

An electrical vehicle plugged into the energy grid has the capability of releasing the electrical energy stored in their energy storage back into the grid when needed. This way, the electrical vehicle becomes an energy provider rather than an energy consumer. The apparatus 30 configured to control the energy stored in the energy storage is thus capable of assessing the energy, and its composition, prior to being released into the grid. Releasing energy into the grid results in depletion of the energy storage and it is handled as such by the apparatus 30 that thereby controls the energy at each releasing event.

The present disclosure further relates to a computer program comprising computer readable code which, when run on an apparatus, causes the apparatus to perform the method, as described above. The computer program may be stored in a memory. The memory can be any combination of a Read And write Memory, RAM, and a Read Only Memory, ROM. The memory may also comprise persistent storage, which, for example, can be any single one or combination of magnetic memory, optical memory, or solid state memory or even remotely mounted memory. When the above-mentioned computer program code is run in a processor of an apparatus (e.g. the controller 305 of apparatus 30), it causes the apparatus to perform the method described above.

The invention claimed is:

1. A method, comprising:
    determining a total quantity of energy stored in an energy storage;
    obtaining energy information stored in an energy provide database, the obtained energy information comprising energy type data identifying a first energy type, wherein, during a certain time interval, energy of the first energy type was provided to the energy storage;
    obtaining energy amount information indicating the amount of the energy of the first energy type that was provided to the energy storage during said certain time period;
    based at least in part on the energy type data stored in the energy provider database and the energy amount information, determining the current composition of the energy stored in the energy storage, wherein determining the current composition comprises: determining a quantity of energy stored in the energy storage that is of the first energy type and a quantity of energy stored in the energy storage that is of a second energy type; and
    storing in a data storage information identifying the determined current composition of the energy stored in the energy storage.

2. The method according to claim 1, further comprising:
    obtaining, from the data storage, information identifying a previously determined composition of the energy stored in the energy storage,
    wherein the step of determining the current composition of the energy stored in the energy storage is further based on the information identifying the previously determined composition of the energy stored in the energy storage.

3. The method according to claim 1, further comprising communicating to a user interface the determined current composition of the energy stored in the energy storage.

4. The method according to claim 1, wherein the method is performed in an electrical vehicle.

5. The method according to claim 1, further comprising:
    determining a time period during which available energy is expected to have a composition that includes renewable energy and the percentage of the renewable energy within the available energy exceeds a predetermined threshold; and
    triggering the adding of energy from the available energy to the energy storage at a point in time within the determined time period.

6. The method according to claim 1, further comprising:
    determining an energy loss from the energy storage; and
    determining a new current composition of the energy stored in the energy stored based on the determined current composition and the determined energy loss.

7. The method according to claim 1, wherein the obtained energy information further comprises a start time, a stop time, a supply time unit, a price and an amount of energy supplied.

8. A computer program, comprising a non-transitory computer readable medium storing computer readable code which, when run on a controller of an apparatus, causes the apparatus to perform the method as claimed in claim 1.

9. The method of claim 1, wherein the obtained energy information further comprises provenance information indicating a provenance of energy of the first energy type.

10. The method of claim 9, wherein the provenance information comprises an energy provider identifier identifying an energy provider that provided the energy of the first energy type.

11. An apparatus for energy control in an energy storage, the energy storage storing energy having a composition of energy, the composition of energy comprising one or more energy types, the apparatus comprising:
    a first interface; and
    a controller coupled to the first interface and to the second interface, wherein the controller is configured to:
    determine a total quantity of energy stored in the energy storage;
    employ the first interface to obtain energy information stored in an energy provider's database, the energy information comprising data identifying a first energy type, wherein, during a certain time interval, energy of the first energy type was provided to the energy storage;
    obtain energy amount information indicating the amount of the energy of the first energy type that was provided to the energy storage during said certain time period;
    based at least in part on the energy type data stored in the energy provider database and the energy amount information, determine the current composition of the energy stored in the energy storage, wherein determining the composition comprises: determining a quantity of energy stored in the energy storage that is of the first energy type and a quantity of energy stored in the energy storage that is of a second energy type; and
    employ the second interface to store in a data storage information identifying the determined current composition of the energy stored in the energy storage.

12. The apparatus according to claim 11, wherein
    the controller is further configured to obtain, from the data storage, information identifying a previously determined composition of the energy stored in the energy storage, and
    the controller is further configured to determine the current composition of the energy stored in the energy storage using the obtained energy information and the information identifying the previously determined composition of the energy stored in the energy storage.

13. The apparatus according to claim 11, wherein the controller is further configured to cause a user interface to display information indicating the determined current composition of the energy stored in the energy storage.

14. The apparatus according to claim 11, wherein the data storage comprises a database, the database having an entry corresponding to an energy type.

15. The apparatus according to claim 11, wherein the data storage is remotely located.

16. The apparatus according to claim 11, wherein the energy information is obtained from a remote database through one of: a wireless link, a machine-to-machine communication, and a power line communication.

17. An electrical vehicle comprising an apparatus according to claim 11.

18. The apparatus according to claim 11, wherein the controller is further configured to:
   determine a time period during which available energy is expected to have a composition that includes renewable energy and the percentage of the renewable energy within the available energy exceeds a predetermined threshold; and
   trigger the adding of energy from the available energy to the energy storage at a point in time within the determined time period.

19. A method, comprising:
   determining an initial total quantity of energy stored in an energy storage, said energy stored in the energy storage including energy produced using a renewable energy source;
   determining an initial composition of said energy stored in the energy storage, wherein determining the composition of said energy comprises determining the percentage of said energy that was produced using a renewable energy source;
   during a time period, adding to the energy storage energy obtained from an energy provider;
   obtaining from the energy provider energy composition information identifying the composition of the energy that was obtained from the energy provider during the time period;
   obtaining energy quantity information indicating the quantity of energy obtained from the energy provider during the time period;
   based at least in part on the determined initial total quantity of energy stored in the energy storage, the initial composition, the energy composition information obtained from the energy provider, and the energy quantity information indicating the quantity of energy obtained from the energy provider during the time period, determining a current composition of the energy stored in the energy storage; and
   storing in a data storage information identifying the determined current composition of the energy stored in the energy storage.

20. The method of claim 19, wherein determining the current composition comprises: determining a quantity of energy stored in the energy storage that is of a renewable energy type and a quantity of energy stored in the energy storage that is of a non-renewable energy type.

* * * * *